United States Patent [19]

Myers

[11] Patent Number: 5,634,358
[45] Date of Patent: *Jun. 3, 1997

[54] MOTORCYCLE IGNITION SWITCH AND STEERING LOCK

[75] Inventor: Gary L. Myers, Monee, Ill.

[73] Assignee: Fort Lock Corporation, River Grove, Ill.

[*] Notice: The term of this patent shall not extend beyond the expiration date of Pat. No. 5,595,079.

[21] Appl. No.: 506,224

[22] Filed: Jul. 24, 1995

Related U.S. Application Data

[63] Continuation-in-part of Ser. No. 19,924, Mar. 15, 1994, and a continuation-in-part of Ser. No. 358,833, Dec. 19, 1994, which is a continuation-in-part of Ser. No. 20,989, Apr. 6, 1994.

[51] Int. Cl.$^6$ ............................................... B62H 5/00
[52] U.S. Cl. ............................ 70/233; 70/185; 70/215
[58] Field of Search .................... 70/181–187, 209–211, 70/215–218, 233, 245–248, 252; 180/287; 307/10.2–10.6

[56] References Cited

U.S. PATENT DOCUMENTS

| 1,076,835 | 10/1913 | Lyons | 70/185 X |
|---|---|---|---|
| 1,408,652 | 3/1922 | Steinberg | 70/185 |
| 4,179,908 | 12/1979 | Schaumburg | 70/185 |
| 4,638,882 | 1/1987 | Sato | 180/287 |
| 4,884,423 | 12/1989 | Fancher | 70/252 X |
| 4,978,940 | 12/1990 | Kaplan | 307/10.3 X |
| 4,987,756 | 1/1991 | Fancher | 70/186 |
| 5,066,941 | 11/1991 | Lau | 307/10.3 X |
| 5,124,565 | 6/1992 | Yoshida et al. | 307/10.3 X |
| 5,172,576 | 12/1992 | Milton | 70/185 |
| 5,255,547 | 10/1993 | Burr et al. | 70/252 |
| 5,291,067 | 3/1994 | Nakakima et al. | 70/233 X |
| 5,343,077 | 8/1994 | Yoshifda et al. | 307/10.3 X |
| 5,454,238 | 10/1995 | Ross et al. | 70/186 |

FOREIGN PATENT DOCUMENTS

| 1240060 | 7/1960 | France | 70/185 |
|---|---|---|---|
| 2182706 | 5/1987 | United Kingdom | 70/379 R |

Primary Examiner—Suzanne Dino
Attorney, Agent, or Firm—Leydig, Voit & Mayer, Ltd.

[57] ABSTRACT

A combination ignition switch and steering lock assembly is provided for use in activating the electrical system of a motorcycle for immobilizing the front steering fork of the motorcycle. In particular, the combination ignition switch and steering lock assembly of the present invention broadly comprises: a housing; a handle assembly coupled to the housing; a key operated lock plug assembly disposed within the handle assembly; a plunger assembly with a dead bolt slidably disposed within the housing; a camming means disposed within the housing for actuating the plunger assembly; and a switch means disposed within the housing for selectively activating the electrical system.

15 Claims, 9 Drawing Sheets

THIRD ROTATABLE POSITION
("ACCESSORY" MODE)

FIRST ROTATABLE POSITION
("OFF" MODE)

FOURTH ROTATABLE POSITION
("FORK LOCK" MODE)

MOTORCYCLE IGNITION SWITCH AND STEERING LOCK

This application is a continuation-in-part of U.S. application Ser. No. 29/019,924, filed on Mar. 15, 1994 and a continuation-in-part of U.S. application Ser. No. 08/358,833 filed on Dec. 19, 1994, which is a continuation-in-part of U.S. application Ser. No. 29/020,989 filed on Apr. 6, 1994.

TECHNICAL FIELD OF THE INVENTION

The present invention relates generally to locks and, more particularly concerns a combination ignition switch and steering lock assembly for use in motorcycles.

BACKGROUND OF THE INVENTION

Ignition switches and steering locks are well known in the motorcycle art. In particular, ignition switches are used to selectively activate the various operational modes of the motorcycle electrical system. Common modes of operation include the "ignition" mode, or engine start-up mode, the "off" mode, and the "accessory" mode. Steering locks, in contrast, are used to immobilize the front steering fork of the motorcycle by selectively engaging a receiving detent formed in the rotating shaft of the motorcycle.

There remains a need, however, for a combination ignition switch and steering lock assembly that reliably incorporates these features into a single device. The present invention seeks to provide such a device.

OBJECTS AND SUMMARY OF THE INVENTION

The primary object of the present invention is to provide a combination ignition switch and steering lock assembly.

A more specific object of the present invention is to provide a combination ignition switch and steering lock assembly for use in motorcycles.

An even more specific object of the present invention is to provide a combination ignition switch and steering lock assembly for use in selectively activating the electrical system of the motorcycle and for selectively immobilizing the front steering fork of the motorcycle.

Another object of the present invention is to provide a combination ignition switch and steering lock assembly having a handle assembly which is rotatable between four distinct positions.

A related object of the present invention is to provide a combination ignition switch and steering lock assembly wherein the four rotatable positions correspond to four distinct modes of motorcycle operation—namely, an "off" mode, an "ignition" mode, an "accessory" mode, and a "fork lock" mode.

Another related object of the present invention is to provide a combination ignition switch and steering lock assembly wherein the handle assembly is also depressibly movable between an undepressed position and a depressed position.

A further object of the present invention is to provide a combination ignition switch and steering lock assembly having a lock plug assembly which is rotatably disposed in the handle assembly.

A related object of the present invention is to provide a combination ignition switch and steering lock assembly wherein the lock plug assembly is rotatable between an unlocked position and a locked position.

Another related object of the present invention is to provide a combination ignition switch and steering lock assembly wherein the handle assembly can be rotationally locked in two of the four rotatable positions but cannot be rotationally locked in the other two rotatable positions.

A further related object of the present invention is to provide a combination ignition switch and steering lock assembly having a key retention feature wherein the key is only removable when the lock plug assembly is in the locked and unlocked positions.

Another object of the present invention is to provide a combination ignition switch and steering lock assembly having a lock plug assembly which is further rotatable into an auxiliary position by activating a release button.

A related object of the present invention is to provide a combination ignition switch and steering lock assembly wherein the handle assembly is removable from the housing by activating the release button and rotating the lock plug assembly into the auxiliary position.

An additional object of the present invention is to provide a combination ignition switch and steering lock assembly comprising a plunger assembly.

A related object of the present invention is to provide a combination ignition switch and steering lock assembly wherein the plunger assembly includes a dead bolt which is linearly actuatable between a disengaged position and an engaged position.

A further related object of the present invention is to provide a combination ignition switch and steering lock assembly wherein the plunger assembly is actuated by a camming means which, in turn, is actuated by the switch knob assembly.

Still another related object of the present invention is to provide a combination ignition switch and steering lock assembly wherein the dead bolt operates to immobilize the front steering fork of the motorcycle when the plunger assembly is in the engaged position.

Yet another object of the present invention is to provide a combination ignition switch and steering lock assembly further comprising a switch means for selectively activating the electrical system of the motorcycle.

A supplemental object of the present invention is to provide an alternative version of the combination ignition switch and steering lock assembly wherein the handle assembly is fixed in place.

Another related object of the present invention is to provide an alternative version of the combination ignition switch and steering lock assembly wherein the lock plug assembly is rotatably and depressibly movably disposed in the switch knob assembly.

A further related object of the present invention is to provide an alternative version of the combination ignition switch and steering lock assembly wherein the lock plug assembly is rotatable between four positions and is depressibly movable between an undepressed position and a depressed position.

Still another object of the present invention is to provide a combination switch and steering lock assembly of the foregoing types which is reliable and convenient to use.

These and other features and advantages of the invention will become apparent upon reading the following description of a preferred exemplified embodiment of the invention, and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the appended claims.

DETAILED DESCRIPTION OF THE PREFERRED EMBODIMENT

Figure 1:
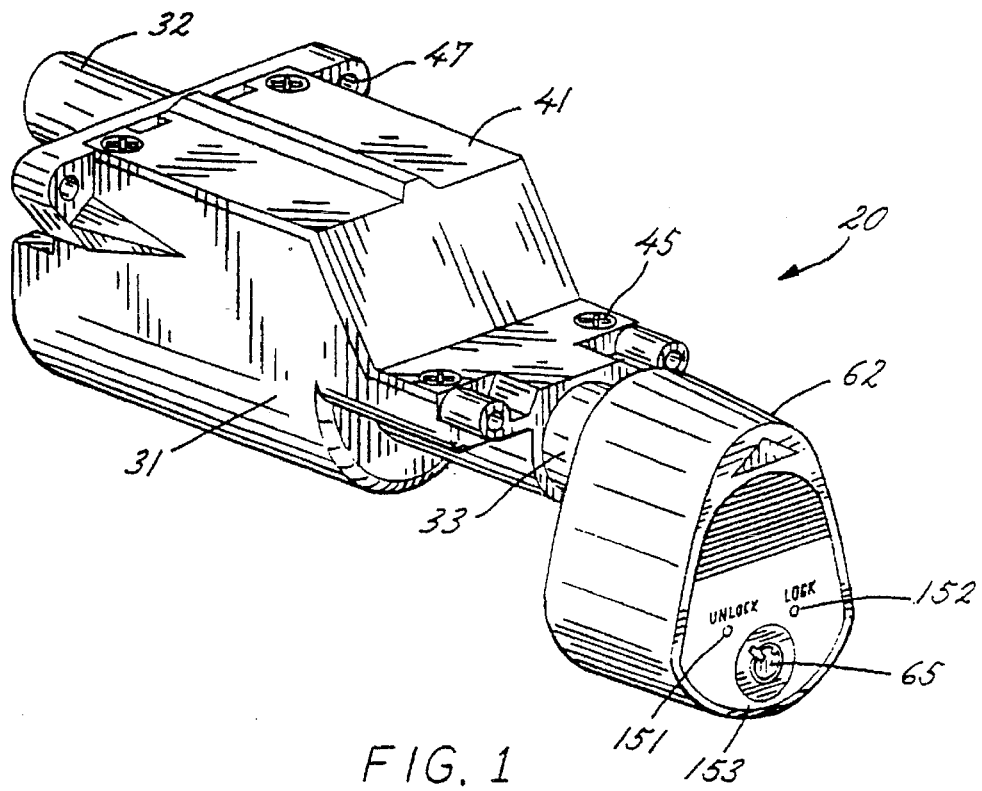
FIG. 1 is a perspective view of the preferred embodiment of a motorcycle ignition switch and steering lock assembly in accordance with the present invention.
Figure 3:
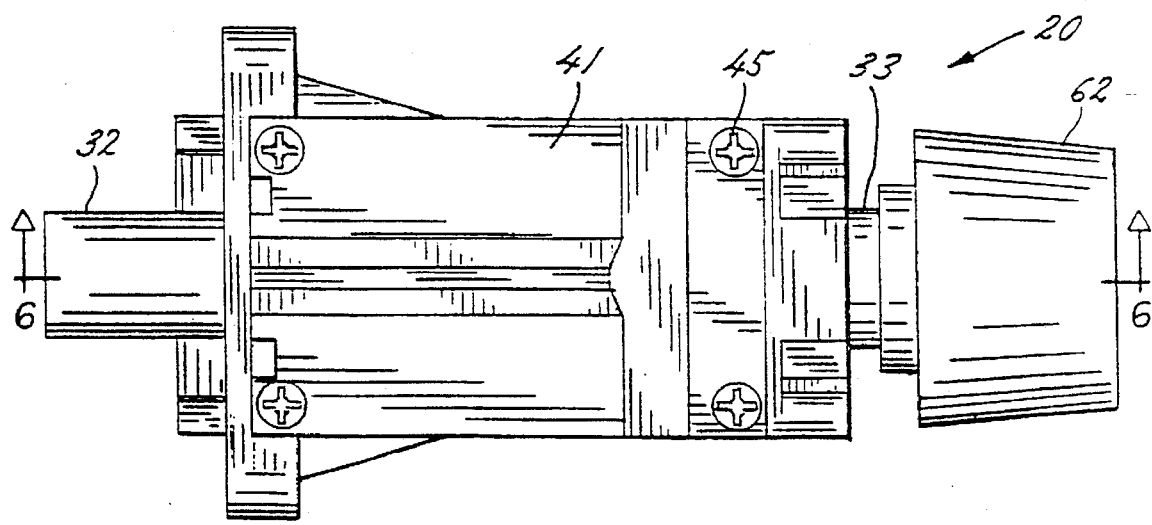
FIG. 3 is a top view of the preferred embodiment.

Referring now specifically to the drawings, FIG. 1 shows a perspective view of a switch and lock assembly 20 in accordance with the present invention. For the purposes of discussing the present invention, the switch and lock assembly will be described as being mounted onto a motorcycle (not shown) and being used: (1) as an ignition switch for activating the electrical system of the motorcycle; and (2) as a lock assembly for immobilizing the front steering fork of the motorcycle. Notwithstanding this characterization, it will be readily appreciated by those skilled in the art that the switch and lock assemblies described and claimed herein may be utilized in other contexts and should not be construed strictly as a motorcycle ignition switch and steering lock assembly.

The motorcycle ignition switch and steering lock assembly of the present invention broadly comprises: a housing; a handle assembly; a lock plug assembly; a plunger assembly; a camming means for linearly actuating the plunger assembly; and a switch means for selectively activating the electrical system of the motorcycle.

Two related embodiments of the present invention will be discussed in detail, namely a preferred embodiment (FIGS. 1–7) and an alternative embodiment (FIGS. 8–18). It should be noted at the outset, though, that the two embodiments are essentially the same except for the handle assembly, the lock plug assembly, and components which interact with either of these two assemblies. In fact, the camming means, the plunger assembly, and the switch means are exactly the same in both embodiments. Thus, although a thorough description of the structure, features, and operation of the preferred embodiment is provided herein, only the pertinent differences between the two embodiments will be addressed in describing the alternative embodiment.

Figure 4:
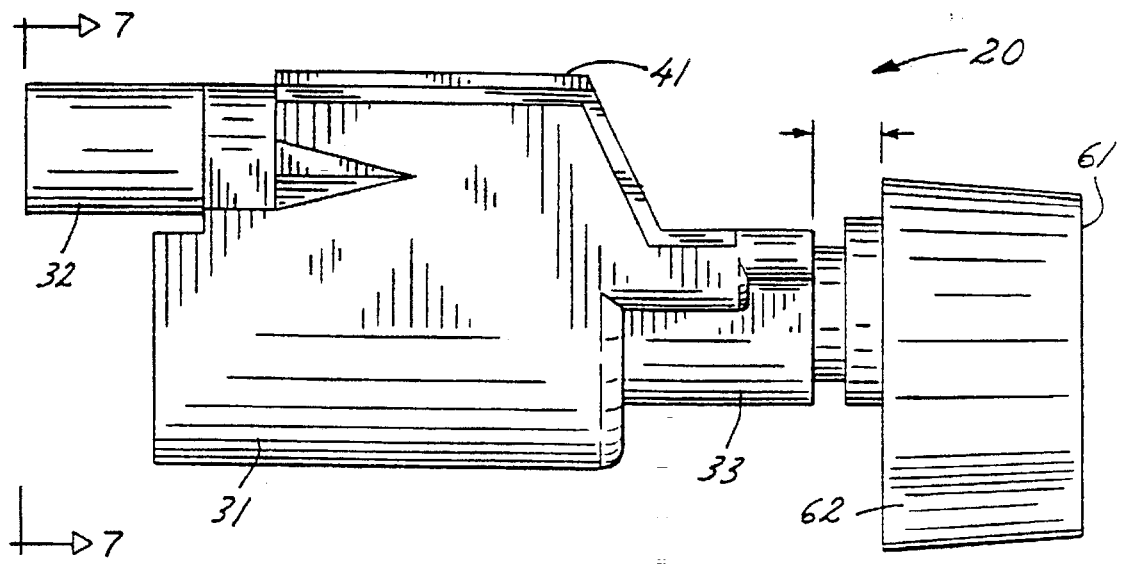
FIG. 4 is a side view of the preferred embodiment showing the handle assembly in the undepressed position and the dead bolt in the disengaged position.

Turning first to the preferred embodiment of the present invention (FIGS. 1–7), the housing generally comprises a shell portion 31 and a cover plate portion 41. In particular, the shell portion 31 includes a sleeve segment 32, which protrudes outwardly from one end of the shell portion 31, a hollow stem segment 33, which protrudes outwardly from the opposite end of the shell portion 31, and first and second internal compartments 35, 39, separated by a partition or flange 38, arranged substantially therebetween. As best shown in FIG. 4, the alignment of the sleeve segment 32 of the housing is substantially parallel to, but offset from, the alignment of the stem segment 33 of the housing. The cover plate portion 42 includes a generally semi-circular plunger sleeve channel 42 and an alignment groove 43 formed therein. The cover plate portion 41 is secured to the shell portion 31 by a plurality of screws 45 and the housing is fixedly attached to the motorcycle via a pair of mounting holes 47.

Figure 2:
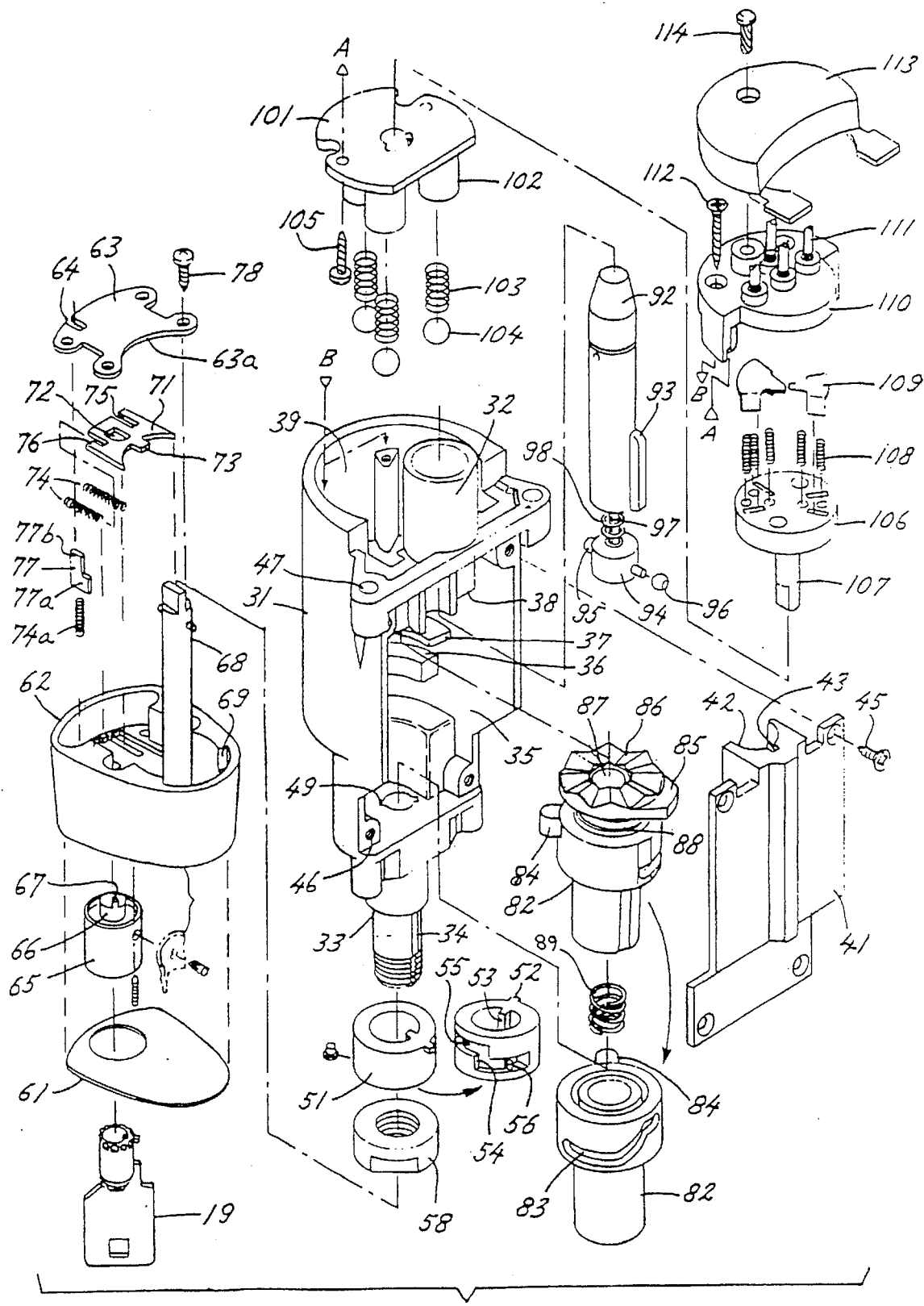
FIG. 2 is an exploded perspective view of the preferred embodiment, exposing the internal component parts thereof.

In the preferred embodiment, the handle assembly broadly comprises a casing portion 62 and an engagement shaft 68 which projects outwardly from the casing portion 62. In accordance with certain objects of the present invention, the handle assembly, and more particularly the casing portion 62 of the handle assembly, is rotatably and slidably coupled to the housing. As depicted in FIG. 2, the engagement shaft 68 is longitudinally slidably received by the stem segment 33 of the shell portion 31 which permits the casing portion 62 of the handle assembly to both rotate and slide relative to the housing.

The handle assembly also comprises a locking plate 71 which is slidably disposed in the casing portion 62 of the handle assembly. The locking plate 71 includes an interior cam contour 72, a locking finger 73, a pair of slots 75, and a truncated leg 76. Preferably, the locking plate 71 is also spring-loaded. In the illustrated embodiment, the locking plate 71 is engaged by a spring 74 compressibly disposed within each slot 75. A bottom cover plate 63, having a notch 64 formed therein, is affixed to the underneath side of the casing portion 62 by a plurality of screws 78. A top cover plate 61 is affixed to the top surface of the casing portion 62 with glue or a like substance.

In the preferred embodiment, the handle assembly further comprises the lock plug assembly 65 rotatably disposed within the casing portion 62 and engageable by a key 19. As shown in FIG. 1, the lock plug assembly 65 is a conventional axial pin tumbler lock plug assembly and is rotatable between an unlocked position 151 and a locked position 152. Also, as shown in FIG. 2, the lock plug assembly 65 includes a spindle 66 which protrudes from the end of the lock plug assembly 65 and an offset projecting cam member 67 which protrudes from the spindle 66. The projecting cam member 67 engages the cam contour 72 of the locking plate 71 and linearly actuates the locking plate 71 when the lock plug assembly 65 is rotated by the key 19. In keeping with an important aspect of the present invention, the lock plug assembly 65 also has a key retention feature which prevents the key 19 from being removed in other than the unlocked and locked positions 151, 152.

The ignition switch and steering lock assembly 20 of the preferred embodiment further comprises a generally cylindrical collar 51 fixedly disposed on the stem segment 33 of the housing and interposed between the casing portion 62 of the handle assembly and the first compartment 35 of the housing. In accordance with certain objects of the present invention, the collar 51 has an outwardly projecting protuberance 52 and an inwardly projecting protuberance 53. In operation, as the handle assembly is rotated relative to the housing, the outwardly projecting protuberance 52 alternatively engages a pair of flange stops 69 formed on the inner contour of the casing portion 62 of the housing. As such, the arrangement of the flange stops 69 in relation to the outward projecting protuberance 52 not only defines the maximum angular rotation of the casing portion 62 of the handle assembly but also prevents the handle assembly from overrotating. The inwardly projecting protuberance 53, on the other hand, mates with a longitudinal groove 34 formed in the stem portion 33 of the housing which prevents the collar 51 from swiveling during use.

Preferably, the collar 51 is secured in place by a hex nut 58 which is screwably disposed on the stem segment 33 of the housing. As shown in FIG. 2, the hex nut 58 is interposed between the collar 51 and the casing portion 62 of the handle assembly. Like the collar 51, the hex nut 58 also receives the engagement shaft 68 of the handle assembly.

In accordance with another important object of the present invention, the collar 51 has a semi-circumferential jogged channel 54 formed therein which receives the locking finger 73 of the locking plate 71. As shown in FIG. 2, the jogged channel 54 has two spaced-apart, generally horizontal portions (i.e. an upper horizontal portion and a lower horizontal portion) and a generally vertical portion disposed therebetween. Preferably, the collar 51 also comprises a recess 55 extending through the end of lower horizontal portion of the jogged channel 54 and a pin stop member 56 formed on the end of the upper horizontal portion of the jogged channel 54.

Figure 5:
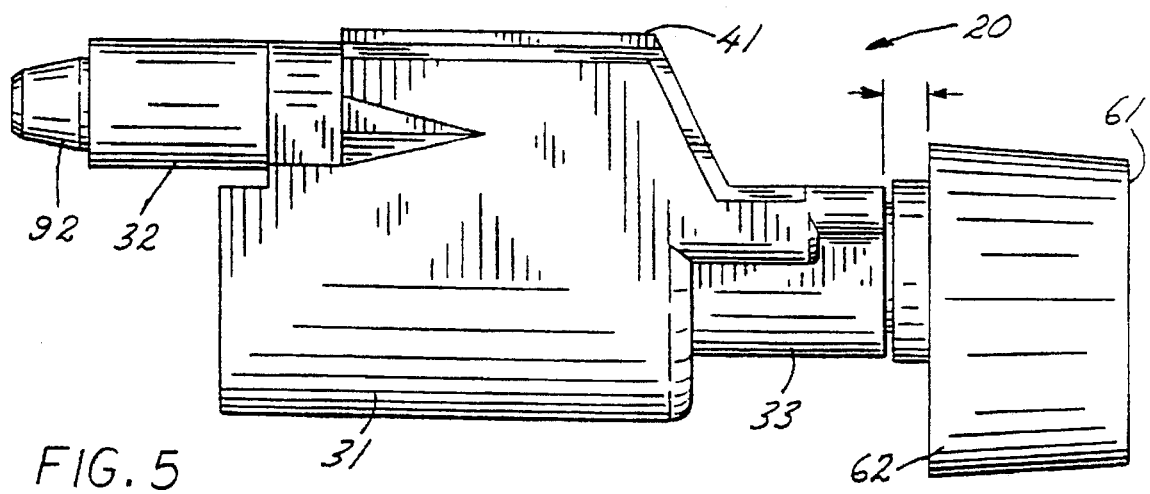
FIG. 5 is a side view of the preferred embodiment showing the handle assembly in the fourth rotational and depressed positions and the dead bolt in the engaged position.
Figure 7:
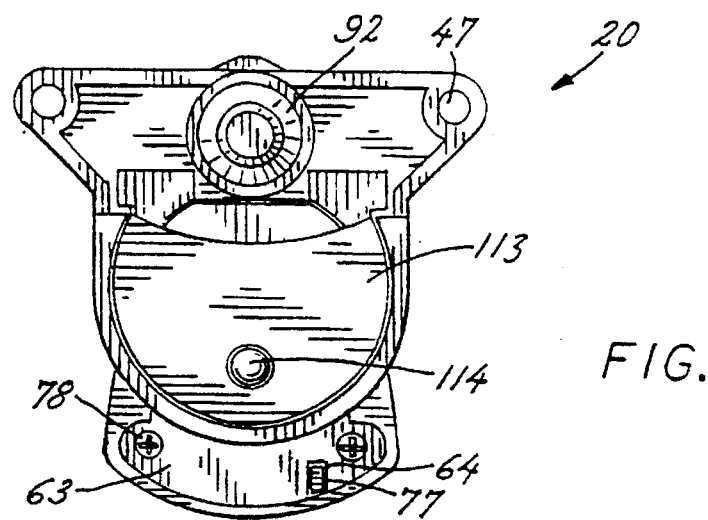
FIG. 7 is an end view of the preferred embodiment, taken along line 7—7 in FIG. 4.

In operation, as the casing portion 62 of the handle assembly is rotated relative to the fixed collar 51, the locking finger 73 moves along and within the jogged channel 54. As such, the vertical portion of the jogged channel 54 dictates how far the handle assembly may be moved or depressed in the vertical direction while the two horizontal portions dictate how far the handle assembly may be rotated. In particular, the handle assembly is depressibly movable between an undepressed position wherein the locking finger 73 of the locking plate 71 is situated in the upper horizontal portion of the jogged channel 54 and a depressed position wherein the locking finger 73 of the locking plate 71 is situated in the lower horizontal portion of the jogged channel 54. Put another way, the handle assembly is depressibly movable between the undepressed position wherein the casing portion 62 is spaced-apart from the first compartment of the housing, as shown in FIG. 4, and the depressed position wherein the casing portion 62 is closer to the first compartment of the housing, as shown in FIG. 5.

As the lock plug assembly 65 is rotated between the unlocked and locked positions 151, 152, the projecting cam member 67 linearly actuates the spring-loaded locking plate 71 between an intermediate position (or a position wherein the locking finger extends 73 into the jogged channel 54 but is not capable of extending into the recess 55 formed through the collar 51) and a fully extended position (or a position wherein the locking finger 73 is capable of extending into the recess 55 formed through the collar 51). Furthermore, although the locking finger 73 extends beyond the forwardmost edge 63a of the back cover plate 63 when the locking plate 71 is in the intermediate position, the locking finger 73 extends even further beyond the forwardmost edge 63a of the back cover plate 63 when the locking plate 71 is in the fully extended position.

In keeping with an important aspect of the present invention, an L-shaped release button 77, under certain circumstances, permits the locking plate 71 to be retracted from the intermediate position to a fully withdrawn position. In particular, when the locking plate 71 is in the fully withdrawn position the locking finger 73 does not engage the jogged channel 54 at all and the locking finger 73 is substantially flush with the forwardmost edge 63a of the back cover plate 63.

As shown in FIG. 2, the L-shaped release button 77 has a wide portion 77a and a narrow portion 77b. The wide portion 77a is disposed between the top cover plate 61 and the bottom cover plate 63 while the narrow portion 77b extends through the notch 64 formed in the bottom cover plate 63. A spring 74a biases the wide portion 77a of the L-shaped release button 77 away from the top cover plate 61. Normally, the wide portion 77a of the L-shaped release button 77 engages the truncated leg 76 of the locking plate 71. In this case, the wide portion 77a acts as an obstruction which prevents the locking plate 71 from moving into the fully withdrawn position. However, when the bias of the spring 74a is overcome and the L-shaped release button 77 is urged in the direction of the top cover plate 61, the wide portion 77a of the L-shaped release button 77 no longer engages the truncated leg 76 of the locking plate 71. When this occurs, the obstruction provided by the wide portion 77a of the L-shaped release button 77 is removed and the locking plate 71 can be withdrawn from the intermediate position. In fact, the locking plate 71 can now be moved into the fully withdrawn position or retracted such that the truncated leg 76 of the locking plate 71 engages the narrow portion 77b of the L-shaped release button 77.

In operation, the locking plate 71 may be actuated from the intermediate position to the fully withdrawn position by pressing the L-shaped release button 77 toward the top cover plate 61 and by rotating the lock plug assembly 65 past the unlocked position 151 to an auxiliary position (i.e. to a position oriented 180° away from the locked position 152 and generally indicated by numeral 153 on FIG. 1). As the lock plug assembly 65 is rotated from the unlocked position 151 to the auxiliary position 153, the projecting cam member 67 of the lock plug assembly 65 linearly actuates the locking plate 71 from the intermediate position to the fully withdrawn position. Conversely, the locking plate 71 may be actuated from the fully withdrawn position to the intermediate position simply by rotating the lock plug assembly 65 from the auxiliary position 153 to the unlocked position 151. In rotating the lock plug assembly 65 from the auxiliary position 153 to the unlocked position 151, no pulling or pushing of the L-shaped release button 77 is necessary.

In sum, the locked position 152 of the lock plug assembly 65 corresponds to the fully extended position of the locking plate 71, the unlocked position 151 of the lock plug assembly 65 corresponds to the intermediate position of the locking plate 71, and the auxiliary position of the lock plug assembly 65 corresponds to the fully withdrawn position of the locking plate 71.

In keeping with an important aspect of the present invention, the handle assembly is removable from the stem segment 33 of the housing when the locking plate 71 is in the fully withdrawn position. This is possible because the locking finger 73 of the locking plate 71 is fully underneath the back cover plate 63 and cannot engage the jogged channel 54 formed within the channel 51. In particular, handle assembly removal is accomplished by urging the L-shaped release button 77 toward the top cover plate 61, by rotating the key 19 to the auxiliary position, and by rotating casing portion 62 of the handle assembly until the engagement shaft 68 engages a spline 49 formed within the stem segment 33 of the housing.

The rotational orientations or positions at which the handle assembly may be rotationally locked relative to the housing is prescribed by the positioning of the recess 55 and the pin stop member 56. In particular, the handle assembly may be rotationally locked in the following circumstances: (1) when the locking plate 71 is in the fully extended position (i.e. the lock plug assembly 65 is in the locked position 152) and the handle assembly is rotated or oriented such that the locking finger 73 of the locking plate 71 engages the recess 55 formed through the jogged channel 54; and (2) when the locking plate 71 is in the fully extended position (i.e. the lock plug assembly 65 is in the locked position 152) and the handle assembly is rotated past the pin stop member 56.

In accordance with certain objects of the present invention, the handle assembly, and more particularly the casing portion 62 of the handle assembly, is rotatable into four distinct positions—namely: (1) a first (or central) rotational position; (2) a second (or first clockwise) rotational position; (3) a third (or second clockwise) rotational position; and (4) a fourth (or first counter-clockwise) rotational position. Moreover, these four rotatable positions correspond with different modes of motorcycle operation and coincide with specific locations on the jogged channel 54.

In particular, the first rotatable position corresponds with an "off" or "neutral" mode, or a mode in which the motorcycle cannot be started, the electrical accessories (e.g. hazard lights) cannot be turned on, and the front fork of the motorcycle cannot be immobilized (or locked). The first rotatable position also coincides with the vertical portion of the jogged channel 54. As such, the handle assembly may be depressibly moved between the undepressed position and depressed position when the handle assembly is in the first rotatable position. Moreover, when the handle assembly is in the first rotatable position, the handle assembly is generally aligned with the housing, as shown in FIG. 1.

The second rotatable position corresponds with an "ignition" mode, or a mode in which the engine of the motorcycle can be started, but the front fork of the motorcycle cannot be immobilized. The second rotatable position is in between the first and third rotatable positions and is reachable from the first rotatable position by rotating the casing portion 62 of the handle assembly partially clockwise. In addition, because there is no recess 55 or pin stop 56 associated with the second rotational position, the handle assembly cannot be rotationally locked in this position.

The third rotatable position of the handle assembly corresponds with the "accessory" mode, or a mode in which the electrical accessories of the motorcycle can be activated, but the motorcycle cannot be started and the front fork cannot be immobilized. The third rotatable position is the most clockwise of the four positions and coincides with rotating the locking finger 73 past the pin stop 56. In operation, the third rotatable position is reachable from the second rotatable position by rotating the casing portion 62 of the handle assembly further clockwise. Also, as described more fully above, the handle assembly may be locked in the third rotatable position if the locking plate 71 is in the extended position.

The fourth rotatable position, in contrast to the first three rotatable positions, corresponds with a "fork lock" mode, or a mode in which the front wheel of the motorcycle can be immobilized. In operation, the fourth rotatable position is reachable from the first rotatable position by depressibly moving the handle assembly from the undepressed position to the depressed position and by rotating the handle assembly fully counter-clockwise. Like the third rotatable position, the handle assembly may be rotationally locked while in the fourth rotatable position simply by turning the lock plug assembly 65 to the locked position (i.e. by moving the locking plate 71 to the fully extended position). Further, there is no an intermediate position between the first and fourth rotatable positions.

Thus, in sum, the handle assembly may be rotationally locked in the two extreme positions (i.e. the third and fourth rotational positions) but may not be rotationally locked in the two intermediate positions (i.e. the first and second rotational positions). Moreover, when the handle assembly is in the undepressed position, the casing portion 62 may be rotated between the first, second, and third rotational positions. However, when the handle assembly is in the depressed position, the casing portion 62 may be only be rotated to the fourth rotational position.

Figure 6:
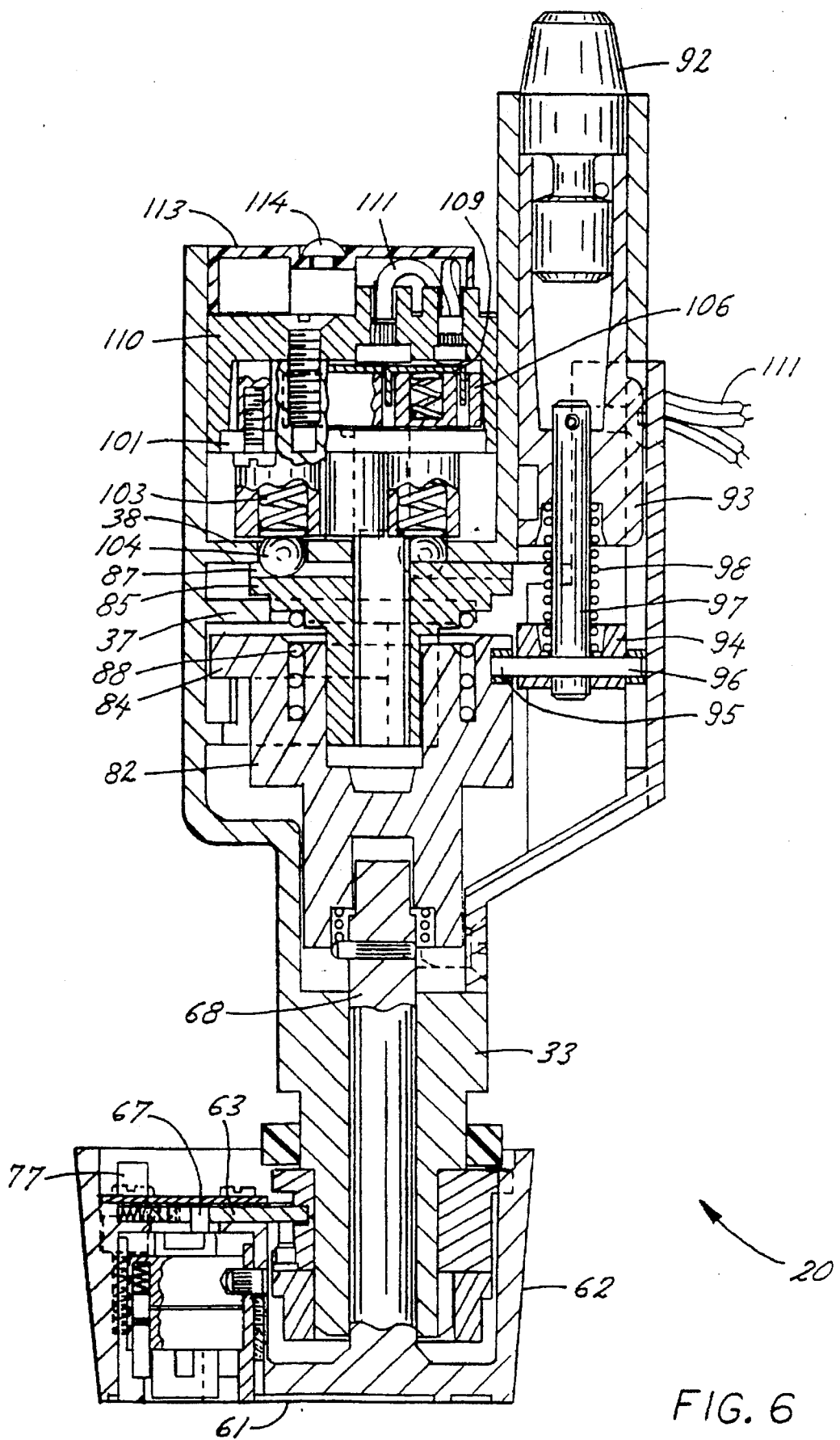
FIG. 6 is a cross-sectional view of the preferred embodiment, taken along line 6—6 in FIG. 3.

The ignition switch and steering lock assembly 20 of the present invention also comprises a camming means. As illustrated in FIGS. 2 and 6, the camming means comprises a drum 82 which is rotatably disposed within the first compartment 35 of the shell portion 31 of the housing. In the preferred embodiment, the drum 82 receives and is attached to the engagement shaft 68 of the handle assembly. In operation, the drum 82 moves in conjunction with the handle assembly. For instance, when the casing portion 62 of the handle assembly is turned relative to the housing, the drum 82 also rotates. Moreover, when the handle assembly is actuated between the undepressed position and the depressed position, the drum 82 also moves in the vertical direction.

As shown in FIG. 2, a cam slot 83 is formed in the outer periphery of the drum 82 and an appendage 84 projects outwardly from the base of the drum 82. In keeping with an important aspect of the present invention, the cam slot 83 has a generally flat portion, which coincides with orientations of the handle assembly transpiring between the first and third rotational positions, and a generally inclined portion, which coincides with orientations of the handle assembly transpiring between the first and fourth rotational positions. In operation, the appendage 84, engages a semi-circumferential jogged channel 36 formed in the first compartment 35 of the shell portion 31 of the housing. Like the jogged channel 54 formed in the collar 51, the jogged channel 36 formed in the first compartment 35 of the housing has two spaced-apart, generally horizontal portions (i.e. an upper horizontal portion and a lower horizontal portion) and a generally vertical portion disposed therebetween. As such, the vertical portion of the jogged channel 36 dictates how far the drum 82 is vertically movable within the first compartment 35 of the housing.

The camming means further comprises a detent plate member 85 having a plurality of detents 86 and a hole 87 therethrough. The detent plate member 85 is longitudinally slidably received by the drum 82 and is rotatably disposed in the first compartment 35 of the shell portion 31 of the housing. In the preferred embodiment, the detent plate member 85 also rotates in conjunction with both the drum 82 and the casing portion 62 of the handle assembly. As shown in FIG. 6, the detents 87 of the detent plate member 85 are disposed between the partition 38 separating the first and second compartments 35, 39 and a flange 37 located between the partition 38 and the jogged channel 36. Preferably, the drum 82 is biased apart from the detent plate member 85 by a spring 88 compressibly disposed therebetween. In use, when the handle assembly is in the first rotational position, the spring 88 biases the handle assembly in the undepressed position (i.e. the handle assembly is biased away from the housing).

The ignition switch and steering lock assembly 20 of the present invention also comprises a plunger assembly which is longitudinally slidably disposed within the sleeve segment 32 of the housing. As best depicted in FIGS. 2 and 6, the plunger assembly broadly comprises a dead bolt 92, a drum engagement portion 94, and a link 97 disposed therebetween. In particular, one end of the link 97 is fixedly attached to the drum engagement portion 94 while the other end of the link 97 is longitudinally slidably disposed within the dead bolt 92. The dead bolt 92 is biased apart from the drum engagement portion 94 by a spring 98 compressibly disposed therebetween. The drum engagement portion 94 further comprises a cam follower 95 and an alignment groove follower 96. In particular, the cam follower 95 is received by the cam slot 83 formed in the drum 82 and the alignment groove follower 96 is received by the alignment groove 43 formed in the cover plate portion 41 of the housing. As shown in FIG. 6, the cam follower 95 and the alignment groove follower 96 may comprise a single member, which extends through and beyond the drum engagement portion 94.

In operation, as the drum 82 rotates within the first compartment 35 of the housing, the cam follower 95 moves along the cam slot 83 while the alignment groove follower 96 moves along the alignment groove 43. In particular, rotation of the drum 82 linearly actuates the plunger assembly between an engaged position, wherein the dead bolt 92 extends beyond the sleeve segment 32 of the housing, and a disengaged position, wherein the dead bolt 92 is fully retracted within the sleeve segment 32 of the housing. Preferably, the dead bolt 92 also comprises an alignment ridge 93 which is received by the alignment groove 43 formed in the cover plate 41 and which slides back and forth in the alignment groove 43 as the plunger assembly is longitudinally slidably actuated between the engaged and disengaged positions.

In keeping with another important aspect of the present invention, the engaged position of the plunger assembly corresponds with the fourth rotational position of the handle assembly. As such, if the handle assembly is in the depressed position and the fourth rotational position, the dead bolt 92 will be in the engaged position and the front steering fork of the motorcycle can be immobilized or locked. On the other hand, if the handle assembly is in the undepressed position (and in either the first, second, or third rotational positions), the dead bolt 92 will be in the disengaged position and the front steering fork of the motorcycle cannot be immobilized or locked.

The ignition switch and steering lock assembly 20 of the present invention also comprises a switch means disposed in the second compartment 39 of the housing for selectively activating the electrical system of the motorcycle. As shown in FIGS. 2 and 6, the switch means broadly comprises a back plate 101, a disk 106, an electrical cap 110, and an electrical cover plate 113. In particular, the back plate 101 has three hollow shafts 102 which project outwardly from the back plate 101. Each shaft 102 has a spring 103 disposed therein and a metal ball 104 disposed thereon. As best depicted in FIG. 6, the metal balls 104 engage holes formed in the partition 38 of the housing and the detents 87 formed on the detent plate member 85. The interaction between the metal balls 104 and the detents 87 is important because it facilitates rotation of the handle assembly into the first, second, third, and fourth rotational positions. The disk 106, like the detent plate member 85, is rotatably coupled to the drum 82. The disk 106 has an engagement post 107 on one side and a plurality of metal contacts 109 arranged on the other side. The disk 106 is coupled to the drum 82 by inserting the engagement post 107 through a hole in the back plate 101 and through the hole 87 in the detent plate member 85. As such, the disk 106 rotates in conjunction with both the casing portion 62 of the handle assembly and the drum 82. The electrical cap 110 has a plurality of wires 111 which are connected to the electrical system of the motorcycle. The electrical cap 110 is fixedly coupled to the back plate 101 by a pair of screws 112 and is arranged substantially adjacent to the disk 106. In operation, as the handle assembly is rotated, the metal contacts 109 of the disk 106 selectively engage the wires 111 of the electrical cap 110. A plurality of springs 108, compressibly disposed between each metal contact 109 and the disk 106, bias the metal contacts 109 against the electrical cap 110. The electrical cover plate 113 encloses the switch means within the second compartment 35 of the housing. As shown in FIG. 2, the electrical cover plate 113 is fixedly attached to the electrical cap 110 by a barbed stud 114 or like fastener.

Turning now to the alternative embodiment of the present invention (FIGS. 8-18), the housing of the switch and lock assembly 220 is identical to the housing of the preferred embodiment except that the stem segment 233 of the shell portion 231 is truncated, an augmented shoulder portion 240 is added to the top of the shell portion 231, and a semi-circumferential jogged channel 244 is formed within the stem segment 233 of the housing (as shown from above in FIGS. 14-18). Like the jogged channel 54 formed in the collar 51 of the preferred embodiment, the jogged channel 244 formed in the stem segment 233 of the alternative embodiment has two-spaced apart horizontal portions (i.e. an upper horizontal portion and a lower horizontal portion) and a vertical portion disposed therebetween.

The handle assembly of the alternative embodiment, and more particularly the casing portion 262 of the handle assembly, also differs from the handle assembly of preferred embodiment in that it is affixed to the housing by a plurality of bolts 279. As depicted in FIGS. 9-12, the bolts 279 are received by a plurality of holes 272 formed in the casing portion 262 of the handle assembly and are threadably received by an equal number of threaded bolt holes 241 disposed in the shoulder portion 240 of the housing.

Figure 9:
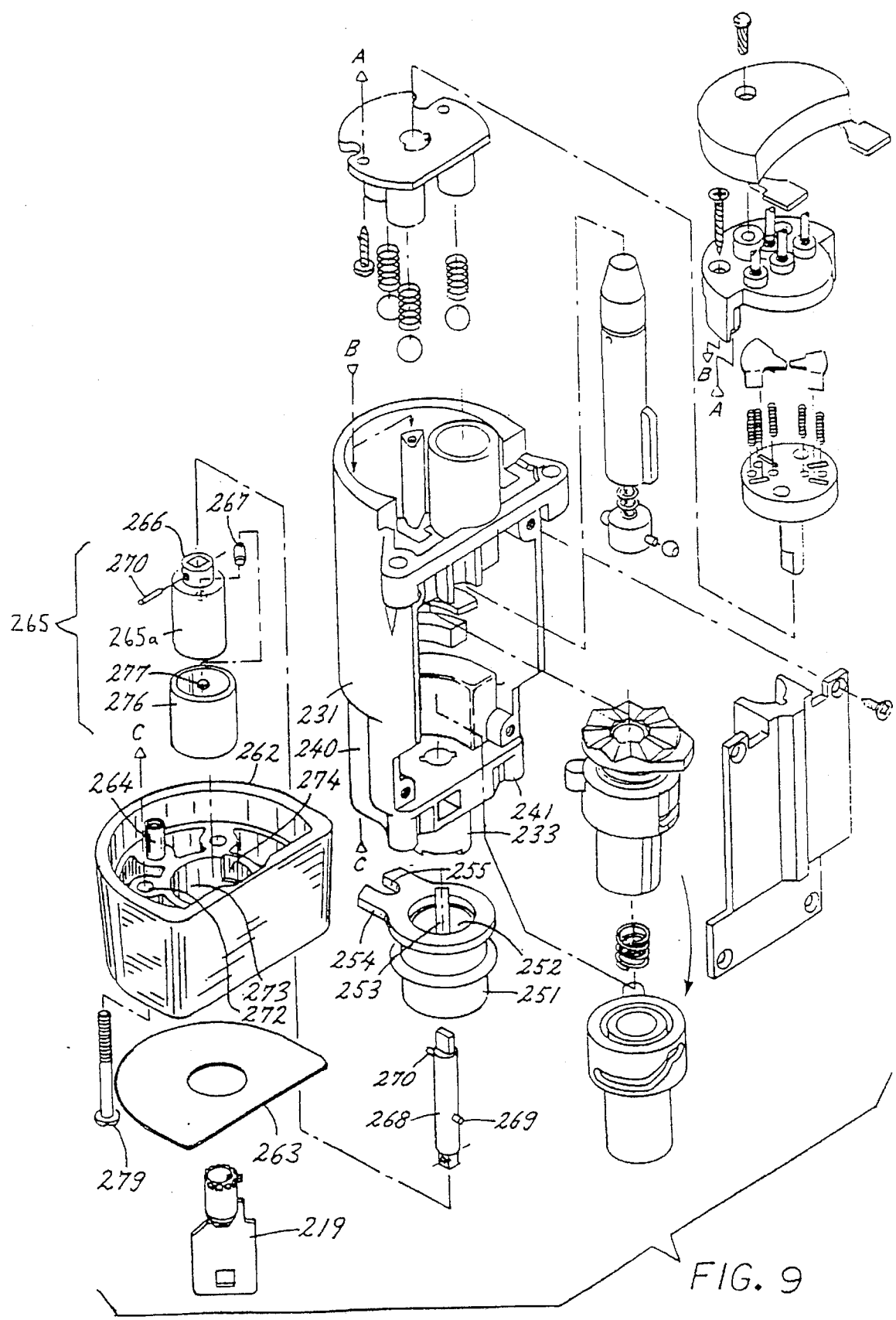
FIG. 9 is an exploded perspective view of the alternative embodiment, exposing the internal component parts thereof.
Figure 11:
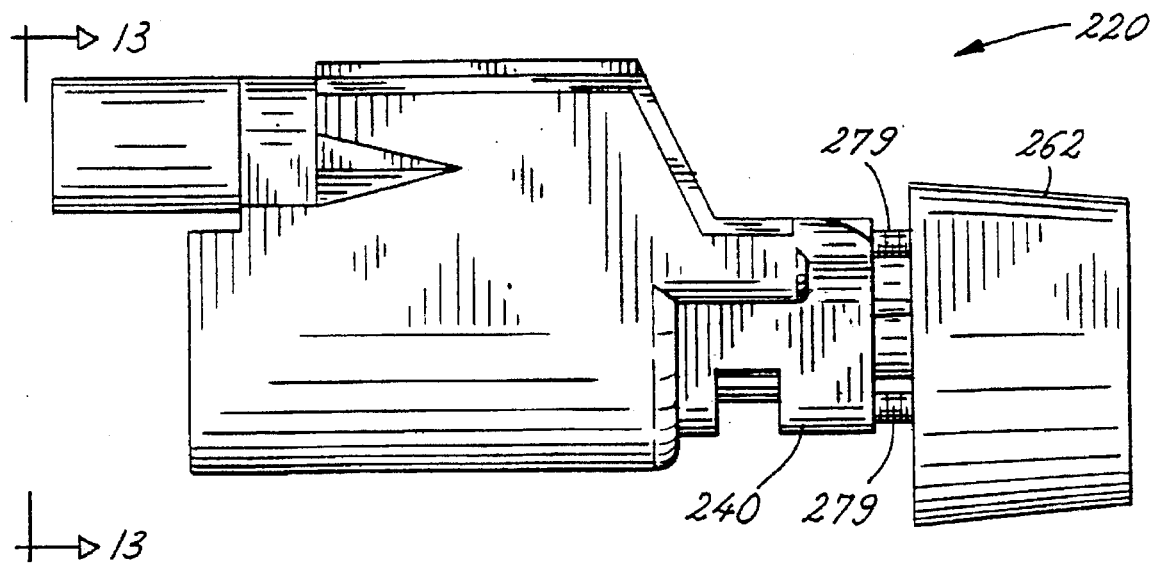
FIG. 11 is a side view of the alternative embodiment.
Figure 13:
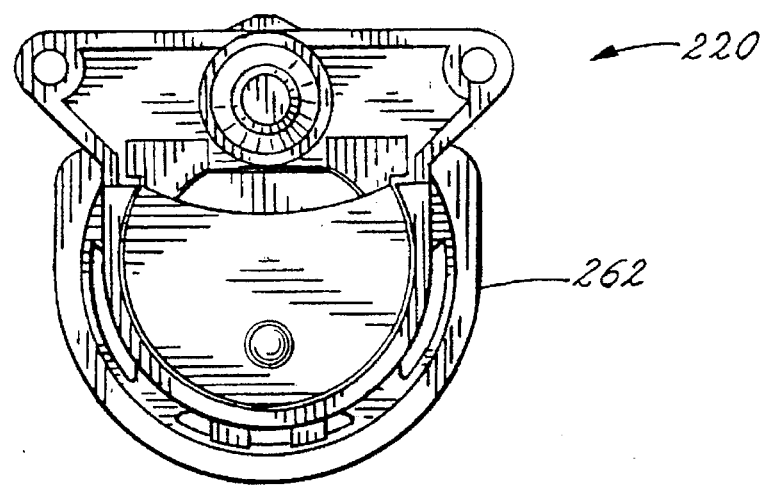
FIG. 13 is an end view of the alternative embodiment, taken along line 13—13 in FIG. 11.
Figure 12:
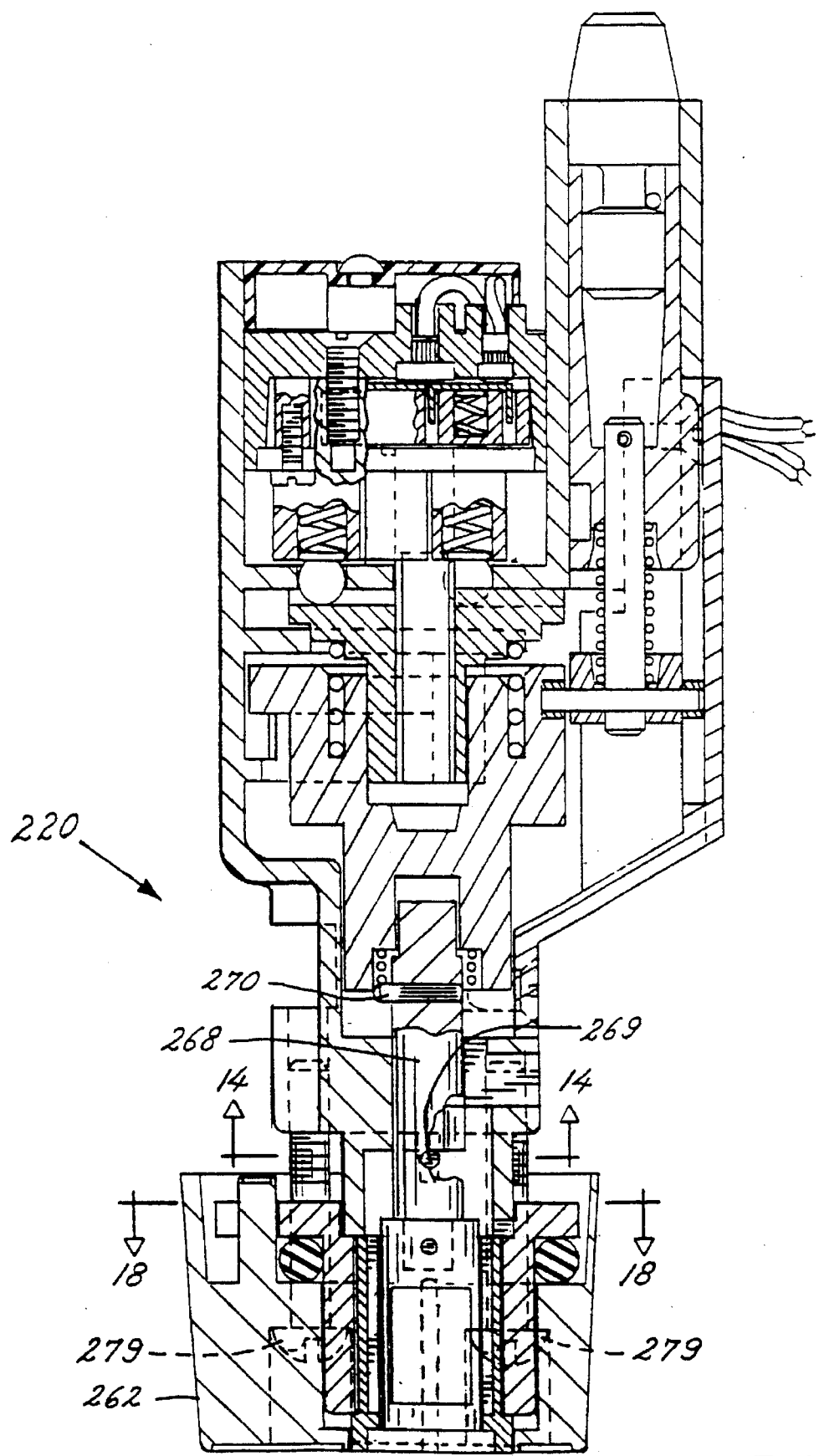
FIG. 12 is a cross-sectional view of the alternative embodiment, taken along line 12—12 in FIG. 10.
Figure 14:
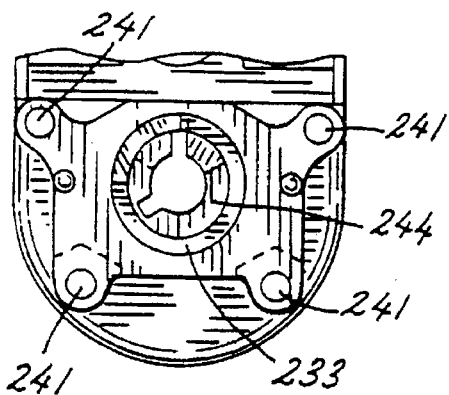
FIG. 14 is a cross-sectional view of the alternative embodiment, taken along line 14—14 in FIG. 12.

In addition to the holes 272 formed therein, the casing portion 262 of the handle assembly of the alternative embodiment further comprises a top surface (to which a top cover plate 263 is affixed), a hole formed through the top surface, and a bore 273 aligned with the hole. In order to keep the lock plug assembly 265 within the casing portion 262 of the handle assembly during use, the diameter of the bore 273 is larger the diameter of the hole. As shown in FIG. 9, the bore 273 also has a longitudinal groove 274 formed therein and a prong 264 projects downwardly from the top surface of the casing portion 262.

Like the preferred embodiment, the lock plug assembly 265 of the alternative embodiment is rotatably disposed within the casing portion 262 of the handle assembly. As shown, for example, in FIGS. 8 and 9, the lock plug assembly 265 is preferably an axially pin tumbler lock assembly comprising an outer cylindrical casing 265a, an inner plug 265b which rotates within the outer casing 265a, and a lock plug housing 276. As best shown in FIG. 9, the outer casing 265a of the lock plug assembly 265 is fixedly staked to the lock plug housing 277 by a small plug member 267. In particular, the small plug member 267 engages and extends through a small radial aperture 277 formed in the lock plug housing 276 which couples the outer casing 265a of the lock plug assembly 265 to the lock plug housing 276. As such, the plug member 267 effectively prevents the lock plug housing 276 from rotating with respect to the outer casing 265a. The inner plug 265b, however, remains rotatable with respect to both the outer casing 265a and the lock plug housing 276.

Figure 8:
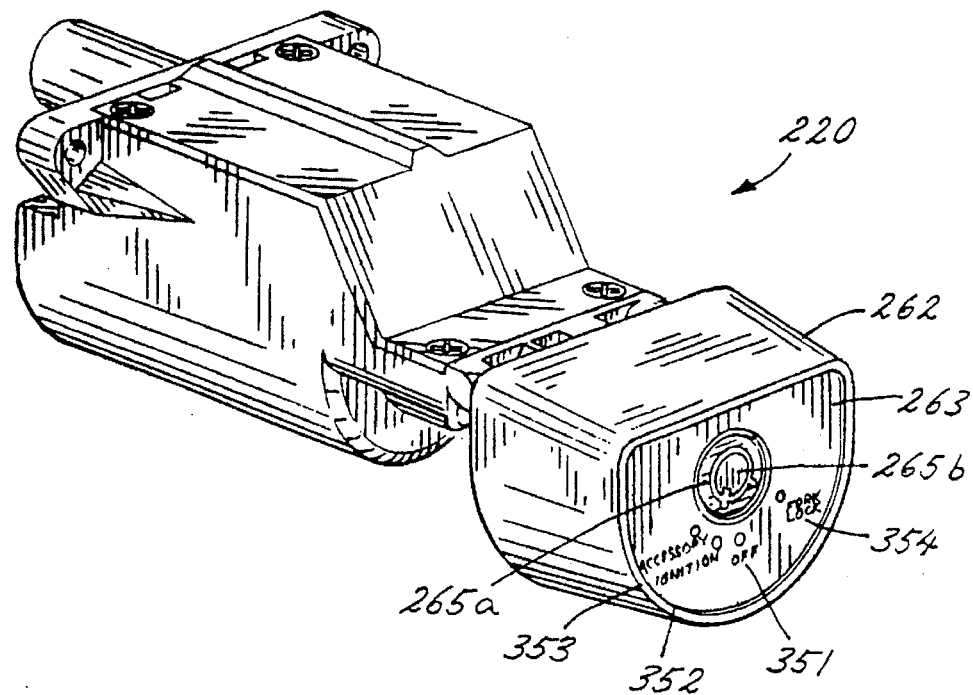
FIG. 8 is a perspective view of an alternative embodiment of the motorcycle ignition switch and steering lock assembly in accordance with the present invention.
Figure 10:
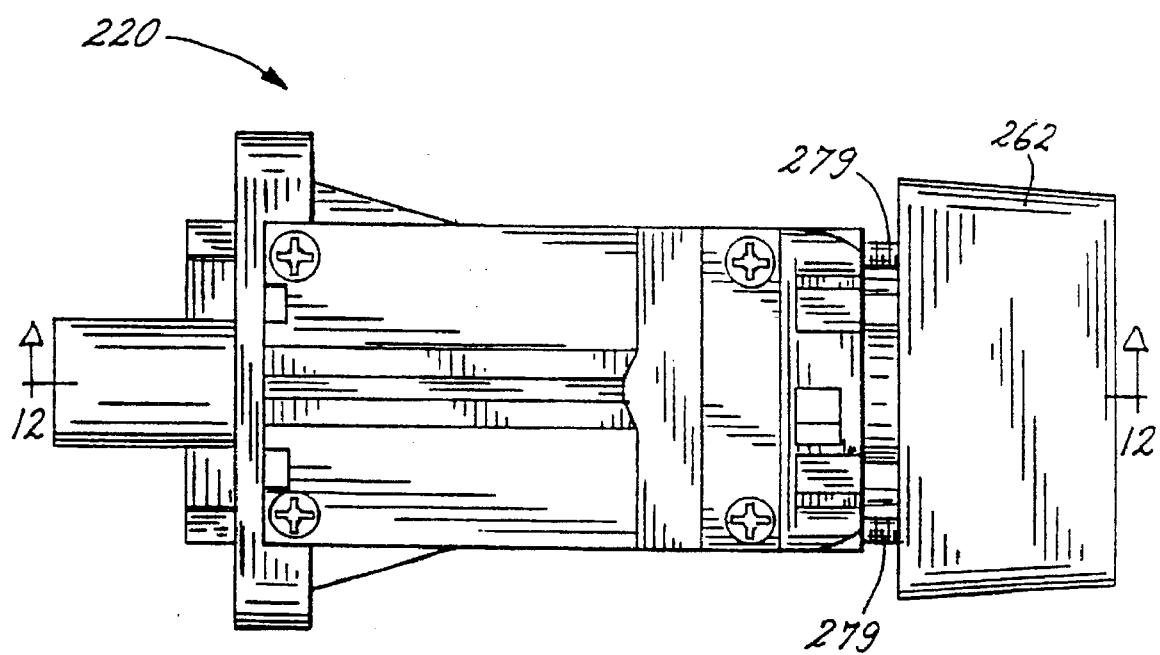
FIG. 10 is a top view of the alternative embodiment.

Moreover, like the handle assembly of the preferred embodiment (but unlike the lock plug assembly 65 of the preferred embodiment), the lock plug assembly 265 of the alternative embodiment is rotatable into four distinct positions—namely: (1) a first (or central) rotatable position; (2) a second (or first clockwise) rotatable position; (3) a third (or second clockwise) rotatable position; and (4) a fourth (or first counter-clockwise) rotatable position. As depicted in FIG. 8, these four rotatable positions correspond with the "off" 351, "ignition" 352, "accessory" 353, and "fork lock" 354 positions or modes, respectively. Moreover, these four modes correspond with the same four modes discussed above in the preferred embodiment.

In contrast to the lock plug assembly 65 of the preferred embodiment, the lock plug assembly 265 of the alternative embodiment is also slidably movably with respect to the housing. In particular, the lock plug housing 276 of the lock plug assembly 265 is slidably disposed within a floating insert member 251. As shown in FIG. 9, the floating insert 251 is arranged on the stem segment 233 of the housing. The floating insert member 251 is generally cylindrical in shape and comprises a bore 252 formed therethrough, an interior longitudinal groove 253 formed in the bore 252, and a flange 254 with a notch 255. The prong 264 of the casing portion 262 of the handle assembly receives the notch 254 of the floating insert 251 which fixedly couples the floating insert 251 to the casing portion 262 of the handle assembly.

Figure 18:
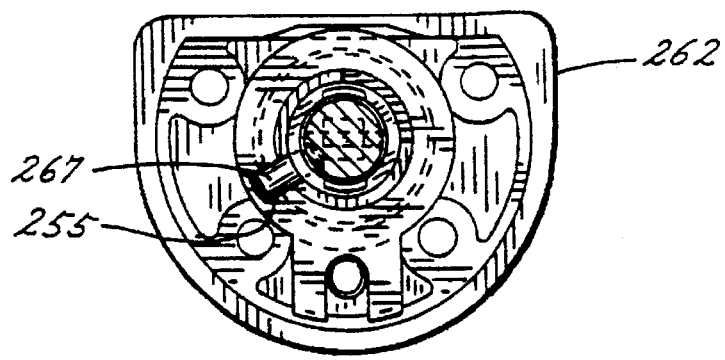
FIG. 18 is cross-sectional view of the alternative embodiment, taken along line 18—18 in FIG. 12.

In particular, the lock plug housing 276 is longitudinally slidably disposed within the bore 252 of the floating insert member 251 such that the interior longitudinal groove 253 formed in the bore 252 of the floating insert 252 receives the plug member 267 of the lock plug assembly 265. The interaction between the longitudinal groove 253 and the plug member 267 not only prevents the lock plug housing 276 and the outer casing 265a of the lock plug assembly 265 from rotating with respect to the floating insert 251, but permits the lock plug assembly 265 to longitudinally slidably move within bore 252 of the floating insert 251. In fact, the length of the longitudinal groove 253 dictates how far the lock plug assembly 265 can slidably move within the casing portion 262 of the handle assembly. Specifically, the lock plug assembly is longitudinally slidably movable between an undepressed position wherein the lock plug is substantially flush with the top surface of the handle assembly and a depressed position wherein the lock plug assembly is in spaced-apart relation with the top surface of the handle assembly. The interaction between the small plug member 267 of the lock plug assembly 265 and the interior longitudinal groove 253 formed in the bore 252 of the floating insert 251 is depicted in FIG. 18.

An engagement shaft 268 having an upper finger 269 and a lower finger 270 couples the lock plug assembly 265 to the camming means. In particular, the top part of the engagement shaft 268 is attached to the spindle 266 of the lock plug assembly 265 while the lower finger 270 is received by the camming means. Thus, as the lock plug assembly 265 is rotated by a key 219, the camming means rotates in conjunction with the lock plug assembly 265. Furthermore, as shown in FIG. 9, the upper finger 269 is received by the jogged channel 244 formed in the stem segment 233 of the housing. More importantly, though, the interaction between the finger 269 of the engagement shaft 268 and the jogged channel formed 244 in the stem segment 233 of the housing is directly analogous to the interaction between the locking finger 273 of the locking plate 271 and the jogged channel 54 formed in the collar 51 of the preferred embodiment. Namely, the vertical portion of the jogged channel 244 dictates how far the lock plug assembly 265 may be moved or depressed in the vertical direction while the two horizontal portions dictate how far the lock plug assembly 265 may be rotated.

Figure 16:
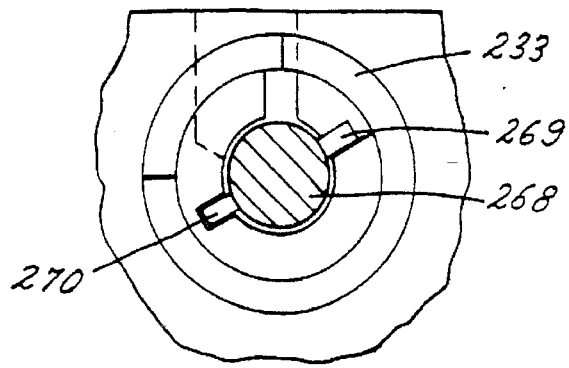
FIG. 16 is an enlarged cross-sectional view of the alternative embodiment also taken along line 14—14 in FIG. 12, showing the interaction between the engagement shaft and the semi-circumferential jogged channel when the motorcycle is in the "accessory" mode.
Figure 15:
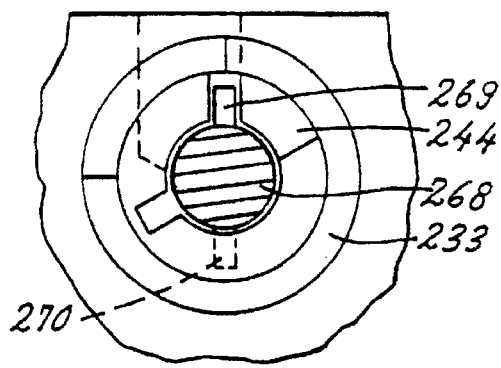
FIG. 15 is an enlarged cross-sectional view of the alternative embodiment also taken along line 14—14 in FIG. 12, showing the interaction between an engagement shaft and a semi-circumferential jogged channel when the motorcycle is in the "off" mode.
Figure 17:
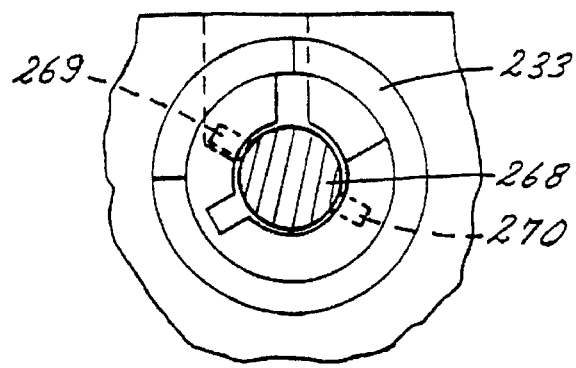
FIG. 17 is an enlarged cross-sectional view of the alternative embodiment also taken along line 14—14 in FIG. 12, showing the interaction between the engagement shaft and the semi-circumferential jogged channel when the motorcycle is in the "fork lock" mode.

FIGS. 15–17 illustrate the interaction between the upper finger 269 of the engagement shaft 268 and the jogged channel 244 formed in the stem portion 233 of the housing as the engagement shaft 268 is rotated between the first and fourth rotatable positions. First, FIG. 15 shows the interaction between the engagement shaft 268 and the jogged channel 244 when the lock plug assembly 265 is in the first rotatable position (i.e. the motorcycle is in the "off" 351 mode). Here, the upper finger 269 resides within the vertical portion of the jogged channel 244. Second, FIG. 16 shows the interaction between the engagement shaft 268 and the jogged channel 244 when the lock plug assembly 265 is in the third rotatable position (i.e. the motorcycle is in the "accessory" 353 mode). In this case, the upper finger 269 is positioned against the end of the upper horizontal portion of the jogged channel 244. Third, FIG. 17 shows the interaction between the engagement shaft 268 and the jogged channel 244 when the lock plug assembly 265 is in the fourth rotatable position (i.e. the motorcycle is in the "fork lock" 354 mode). Here, the upper finger 269 is positioned against the end of the lower horizontal portion of the jogged channel 244.

The camming means, the plunger assembly, and the switch means of the alternative embodiment are the same as described in the preferred embodiment. Thus, for a detailed description of the structure, features, and operation of these components, refer to the appropriate sections above.

I claim as my invention:

1. An ignition switch and steering lock assembly for use in selectively activating an electrical system and for selectively immobilizing a steering mechanism, the ignition switch and steering lock assembly comprising, in combination:

a housing having a shell portion and a cover plate portion, the shell portion having a hollow stem segment protruding from one end and a sleeve segment protruding from the opposite end, the stem segment being arranged substantially parallel to the sleeve segment;

a handle assembly coupled to the stem segment of the housing, the handle assembly having a bore therein;

a key operated lock plug assembly rotatably disposed within the bore of the handle assembly;

a plunger assembly longitudinally slidably disposed within the sleeve segment of the housing, the plunger assembly having a dead bolt;

a camming means rotatably disposed within the housing and operatively connected to the plunger assembly for linearly actuating the plunger assembly between an engaged position wherein the dead bolt extends beyond the sleeve segment of the housing and a disengaged position wherein the dead bolt is fully retracted within the sleeve segment of the housing; and a switch means disposed within the housing and operatively connected to the camming means for selectively activating the electrical system when the camming means is rotated within the housing.

2. A switch and lock assembly in accordance with claim 1 wherein the handle assembly is rotatably and slidably attached to the stem segment of the housing.

3. A switch and lock assembly in accordance with claim 2 wherein the handle assembly is rotatable between a first rotatable position corresponding to an off mode wherein the electrical system is deactivated and an engine operatively connected to the electrical system cannot be started and wherein the plunger assembly is in the disengaged position and the steering mechanism is movable, a second rotatable position corresponding to an ignition mode wherein the electrical system is activated and the engine can be started and wherein the plunger assembly is in the disengaged position and the steering mechanism is movable, a third rotatable position corresponding to an accessory mode wherein the electrical system is activated but the engine cannot be started and wherein the plunger assembly is in the disengaged position and the steering mechanism is movable, and a fourth rotatable position corresponding to a lock mode wherein the plunger assembly is in the engaged position and the steering mechanism is immobilized.

4. A switch and lock assembly in accordance with claim 1 wherein the handle assembly is fixedly coupled to the housing and the lock plug assembly is longitudinally slidably disposed within the bore of the handle assembly.

5. A switch and lock assembly in accordance with claim 4 wherein the camming means comprises a drum which is operatively connected to both the lock plug assembly and the plunger assembly.

6. A switch and lock assembly in accordance with claim 1 wherein the sleeve segment of the housing is offset from the stem segment of the housing.

7. A switch and lock assembly in accordance with claim 1 wherein the lock plug assembly is an axial pin tumbler lock plug assembly.

8. A switch and lock assembly in accordance with claim 2 wherein the camming means comprises a drum which is operatively connected to both the handle assembly and the plunger assembly.

9. An ignition switch and steering lock assembly for use in selectively activating an electrical system and for selectively immobilizing a steering mechanism, the ignition switch and steering lock assembly comprising, in combination:

a housing having a shell portion and a cover plate portion, the shell portion having a hollow stem segment protruding from one end and a sleeve segment protruding from the opposite end, the sleeve segment being arranged substantially parallel to the stem segment;

a handle assembly rotatably and slidably attached to the stem segment of the housing, the handle assembly being slidably movable between an undepressed position wherein the handle assembly is spaced-apart from the sleeve segment and a depressed position wherein the handle assembly is closer to the sleeve segment;

a lock plug assembly rotatably disposed within the handle assembly, the lock plug assembly being rotatable between a locked position and an unlocked position;

a plunger assembly longitudinally slidably disposed within the sleeve segment of the housing, the plunger assembly including a dead bolt;

a camming means rotatably disposed within the housing and operatively connected to both the plunger assembly and the handle assembly for slidably moving the plunger assembly within the sleeve segment of the housing when the handle assembly is rotated and slidably moved with respect to the stem segment of the housing, the plunger assembly being movable between an engaged position wherein the dead bolt extends beyond the sleeve segment of the housing and a disengaged position wherein the dead bolt is fully retracted within the sleeve segment of the housing; and a switch means disposed within the housing and operatively connected to the camming means for selectively activating and deactivating the electrical system when the handle assembly is rotated with respect to the stem segment of the housing.

10. A switch and lock assembly in accordance with claim 9 wherein the handle assembly is rotatable between:

a first rotatable position corresponding to an off mode wherein the electrical system is deactivated and an engine operatively connected to the electrical system cannot be started and wherein the handle assembly is in the undepressed position, the plunger assembly is in the disengaged position, and the steering mechanism is non-immobilized;

a second rotatable position corresponding to an ignition mode wherein the electrical system is activated and the engine can be started and wherein the handle assembly is in the undepressed position, the plunger assembly is in the disengaged position, and the steering mechanism is non-immobilized;

a third rotatable position corresponding to an accessory mode wherein the electrical system is activated but the engine cannot be started and wherein the handle assembly is in the undepressed position, the plunger assembly is in the disengaged position, and the steering mechanism is non-immobilized; and a fourth rotatable position corresponding to a lock mode wherein the handle assembly is in the depressed position, the plunger assembly is in the engaged position, and the steering mechanism is immobilized.

11. A switch and lock assembly in accordance with claim 10 wherein the handle assembly is rotatable into all four distinct positions when the lock plug assembly is in the unlocked position.

12. A switch and lock assembly in accordance with claim 9 wherein the plunger assembly is in the engaged position when the handle assembly is in the depressed position.

13. An ignition switch and steering lock assembly for use in selectively activating an electrical system and for selectively immobilizing a steering mechanism, the ignition switch and steering lock assembly comprising, in combination:

a housing having a shell portion and a cover plate portion, the shell portion having a hollow stem segment protruding from one end and a sleeve segment protruding from the opposite end, the sleeve segment being arranged substantially parallel to the stem segment;

a handle assembly fixedly mounted to the stem segment of the housing, the handle assembly having a top surface and a bore formed therethrough;

a lock plug assembly rotatably and longitudinally slidably disposed in the bore of the handle assembly, the lock plug assembly being slidably movable between an undepressed position wherein the lock plug assembly is substantially flush with the top surface of the handle assembly and a depressed position wherein the lock plug assembly is spaced-apart from the top surface of the handle assembly;

a plunger assembly longitudinally slidably disposed within the sleeve segment of the housing, the plunger assembly including a dead bolt;

a camming means rotatably disposed within the housing and operatively connected to both the plunger assembly and the lock plug assembly for slidably moving the plunger assembly within the sleeve segment of the housing when the lock plug assembly is rotated and slidably moved with respect to the bore of the handle assembly, the plunger assembly being movable between an engaged position wherein the dead bolt extends beyond the sleeve segment of the housing and a disengaged position wherein the dead bolt is fully retracted within the sleeve segment of the housing; and a switch means disposed within the housing and operatively connected to the camming means for selectively activating and deactivating the electrical system when the lock plug assembly is rotated with respect to the bore of the handle assembly.

14. A switch and lock assembly in accordance with claim 13 wherein the lock plug assembly is rotatable between:

a first rotatable position corresponding to an off mode wherein the electrical system is deactivated and an engine operatively connected to the electrical system cannot be started and wherein the lock plug assembly is in the undepressed position, the plunger assembly is in the disengaged position, and the steering mechanism is non-immobilized;

a second rotatable position corresponding to an ignition mode wherein the electrical system is activated and the engine can be started and wherein the lock plug assembly is in the undepressed position, the plunger assembly is in the disengaged position, and the steering mechanism is non-immobilized;

a third rotatable position corresponding to an accessory mode wherein the electrical system is activated but the engine cannot be started and wherein the lock plug assembly is in the undepressed position, the plunger assembly is in the disengaged position, and the steering mechanism is non-immobilized; and a fourth rotatable position corresponding to a lock mode wherein the lock plug assembly is in the depressed position, the plunger assembly is in the engaged position, and the steering mechanism is immobilized.

15. A switch and lock assembly in accordance with claim 13 wherein the plunger assembly is in the engaged position when the lock plug assembly is in the depressed position.

* * * * *